United States Patent [19]

Leiber

[11] Patent Number: 4,759,589

[45] Date of Patent: Jul. 26, 1988

[54] MOTOR VEHICLE WITH ANTI-BLOCKING BRAKE SYSTEM

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 84,433

[22] Filed: Aug. 12, 1987

[30] Foreign Application Priority Data

Aug. 13, 1986 [DE] Fed. Rep. of Germany ....... 3627550

[51] Int. Cl.⁴ ............................................... B60T 8/32
[52] U.S. Cl. ........................................ 303/96; 303/97; 303/100; 303/103; 303/109; 364/426
[58] Field of Search ............... 303/96, 100, 97, 95, 303/105, 106, 108, 109, 103, 92, 111, 20; 364/426; 188/181 C; 180/244, 197

[56] References Cited

U.S. PATENT DOCUMENTS

| | | | |
|---|---|---|---|
| 3,535,004 | 10/1970 | Howard et al. | 303/96 |
| 4,005,910 | 2/1977 | Leiber et al. | 303/96 |
| 4,280,740 | 7/1981 | Ohmori et al. | 303/92 |
| 4,576,419 | 3/1986 | Leiber | 303/100 |
| 4,657,314 | 4/1987 | Leiber | 303/96 X |
| 4,693,522 | 9/1987 | Wupper et al. | 303/106 X |

FOREIGN PATENT DOCUMENTS 2518196 11/1976 Fed. Rep. of Germany.
3209369 9/1983 Fed. Rep. of Germany.

OTHER PUBLICATIONS

AT2, 88, (1986)5, pp. 273-284.
AT2, 88, (1986)6, pp. 345-349.

Primary Examiner—Douglas C. Butler
Attorney, Agent, or Firm—Barnes & Thornburg

[57] ABSTRACT

A motor vehicle with an anti-blocking system, with an electronic unit which produces from signals coordinated to the vehicle velocity and the vehicle cross-acceleration an output signal which in case of braking in a four-channel anti-blocking brake system switches the brake regulating method for the rear wheels from "select low" to "select high", which with a three-channel anti-blocking brake system increases the response-slippage value for the regulating commencement of the rear wheel brakes and which with a vehicle equipped with an anti-blocking brake system and an automatically lockable differential, locks this differential. The switching, increase, respectively, locking thereby takes place with a predetermined rise velocity. With a motor vehicle equipped in such a manner, the possible brake path is reduced, especially with differing traction coefficients at the wheels. In curves driven through with excessive vehicle cross acceleration for the vehicle velocity, the shifting does not take place in order not to reduce in those cases the lateral guide force at the wheels.

8 Claims, 1 Drawing Sheet

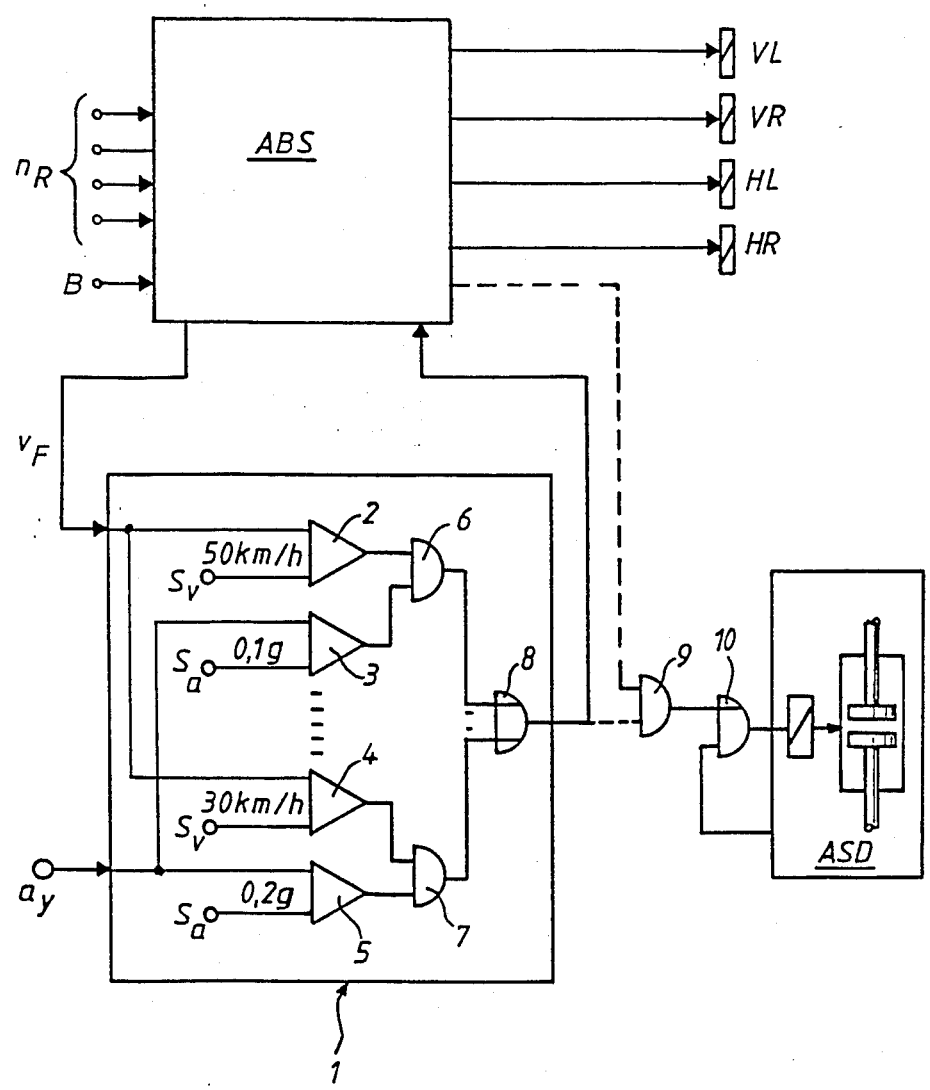

MOTOR VEHICLE WITH ANTI-BLOCKING BRAKE SYSTEM

BACKGROUND AND SUMMARY OF THE INVENTION

The present invention relates to a motor vehicle with an anti-blocking brake system in which the brake force at the wheel brakes of the rear wheels are regulated at some time on the basis of the wheel movement behavior of the wheel tending to block first and at some time on the basis of the wheel movement behavior of the wheel tending to block last, referred to as "select low" and "select high" regulatory method.

Motor vehicles which are equipped with an anti-blocking brake system (ABS), respectively, with an automatically blockable differential (ASD) are generally known.

For the regulation of the brake force at the wheels of the rear axle, the so-called "select low" method is generally used in an ABS; this means a common regulation of both wheels in dependence on the rotational behavior of the wheel with the lower traction coefficient.

This method was introduced in order to keep as small as possible and controllable the yaw reaction of the vehicle (rotation about the vertical axis) if different traction coefficients occur at the wheels (so-called "asymmetric road surface").

This reduction of the yaw reaction is accepted with a lengthening of the brake path because with differing traction coefficients too little brake pressure is always supplied to the wheel with the higher traction coefficient.

The present invention is therefore concerned with the task to provide an arrangement with the aid of which it is possible at least in the case of a regulated braking on an asymmetric road surface to reduce the possible brake path up to standstill of the vehicle.

The underling problems are solved according to the present invention by an electronic unit which, in dependence on a comparison of at least one value pair of instantaneous vehicle velocity and instantaneous vehicle cross-acceleration with predetermined threshold values, produces an output signal which, in case of a four-channel ABS, effects a shifting of the regulating method of the ABS from "select low" to "select high", in case of a three-channel ABS, effects a shifting of the predetermined slippage threshold value to a higher value and with a vehicle equipped with an ABS and an ASD effects in case of a regulated braking a switching-on of the ASD.

In order not to provoke a sudden yaw reaction of the vehicle as a result of this shifting, respectively, switching-on, provision is made according to the present invention to permit at least at higher vehicle velocities the rise of the brake pressure at the wheel with the higher traction coefficient, respectively, the increase of the slippage threshold, respectively, the rise of the locking action of the ASD only with a predetermined preselectable velocity increase.

It is possible in this manner to reduce the braking path without causing any significant yaw reactions.

As the shifting from "select low" also goes in the direction of a reduction of the lateral guide force, provision is made according to the present invention to predetermine minimum track radii, respectively, maximum cross-accelerations in dependence on the vehicle velocity which must not be dropped below, respectively, exceeded.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single FIGURE is a schematic block diagram of one embodiment in accordance with the present invention.

DETAILED DESCRIPTION OF THE DRAWING

The single FIGURE of the drawing relates to a motor vehicle equipped with a four-channel anti-blocking brake system, whereby the vehicle is not shown in the drawing.

The schematic illustration shows a box designated by ABS which is to contain the entire electronics of the ABS and to which the signals $n_R$ of the wheel rotational speed sensors and a signal B produced during actuation of the brake pedal are fed.

The electronics produce therefrom in a known manner activating signals for the schematically illustrated electro-magnetically actuated control valves (three-way valves) VL, VR, and HL, HR (in front left, in front right, in the rear left and in the rear right) for increasing, decreasing and keeping constant the brake pressure at the individual wheels.

The brake pressure regulation at the front wheels thereby takes place individually, as known, dependent on each wheel's own rotational speed behavior whereas the brake pressure regulation of the rear wheels takes place according to the so-called "select low" principle, dependent on the rotational speed behavior of the wheel with the lower traction coefficient.

The electronic unit according to the present invention is combined in a box generally designated by reference numeral 1. The vehicle velocity $v_F$ which is taken for the sake of simplicity from the ABS, because it is already present thereat, and the vehicle cross acceleration $a_y$ determined by a sensor are fed as input magnitudes to this electronic unit 1.

Comparators 2 to 5 are provided in the electronic unit 1, whereby two comparators each 2 and 3, respectively, 4 and 5 are coordinated to a value pair which consists, respectively, of the velocity threshold value $S_v$ and a cross-acceleration threshold value $S_a$.

For the sake of simplicity, only two such comparator pairs are illustrated. However, also a large number of such pairs may be provided. The instantaneous vehicle velocity $v_F$ is fed to the one comparator, for example, to the comparator 2 at one input thereof, and a predetermined threshold value $S_v$, for example, 50 km/h is applied to the other input of the comparator 2. The comparator 2 produces an output signal when the threshold value is not exceeded, i.e., when the vehicle velocity $v_F$ is therefore smaller than 50 km/h.

In the comparator 3, the instantaneous cross-acceleration $a_y$ is compared with a cross-acceleration threshold value $S_a$, for example, 0.1 g, coordinated to the vehicle velocity threshold value. The comparator 3 produces an output signal when the threshold value also is not exceeded, i.e., the vehicle cross-acceleration therefore amounts to less than 0.1 g.

The output signals of the two comparators 2 and 3 are conducted by way of an AND-element 6 which produces an output signal when both comparators have an output signal, i.e., when both input magnitudes $v_F$ and $a_y$ have not exceeded their threshold values.

The comparators 4 and 5 with the AND-element 7 have the same operation, which produces an output signal when $v_F < 30$ km/h and $a_y < 0.2$ g.

The output signals of the AND-elements 6 and 7 are conducted by way of an OR-element 8 whose output signal is fed to the ABS electronics and effects thereat a shifting of the rear wheel brake regulating method from "select low" to "select high" with a low pressure rise at the wheel with higher traction coefficient. If the output signal of the OR-element 8 disappears, then the system again switches to the "select low" regulation.

If, in addition to the ABS, an automatically lockable differential (ASD) is also present in the vehicle, which normally is disengaged or turned-off immediately upon response of the ABS, then the output signal of the OR-element 8 can also be utilized in the alternative for the purpose to lock in case of a regulated braking this differential ASD with predetermined rise velocity (that is, slowly). This possibility is also schematically shown in the drawing in that the output signal of the OR-element 8 and a signal which appears when a regulating operation takes place in the ABS, shown in dash lines, are conducted to the inputs of an AND-element 9 whose output signal is combined with the ASD signal, properly speaking, by way of an OR-element 10 and, alternative thereto, effects a locking of the ASD with predetermined rise velocity if at least one $v_F/a_y$ value pair is not exceeded and the ABS is in the regulating condition.

The same action as the shifting of the four-channel ABS, respectively, locking of the ASD, can be achieved with a three-channel ABS (regulation of the brake force at the rear wheels by way of a common three-way valve), if the output signal of the OR-element 8 effects thereat a slow increase of the slippage threshold to a value >50%. The present invention is also applicable to brake-regulating systems with diagonal brake circuit distribution.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A motor vehicle with a four-channel anti-blocking brake system in which the brake force at the wheel brakes of the rear wheels is regulated at times on the basis of the wheel movement behavior of the wheel indicating a blocking tendency first (select low) and at times on the basis of the wheel movement behavior of the wheel indicating a blocking tendency last (select high), comprising a cross-accelerator comparator means which upon exceeding a predetermined cross-acceleration value inverts its output signal, vehicle velocity comparator means which upon exceeding a predetermined vehicle velocity value inverts its output signal and electronic means to which are fed as input magnitudes the instantaneous vehicle velocity and the instantaneous cross-acceleration, at least one value pair of a vehicle velocity threshold value and of a cross-acceleration threshold value coordinated thereto being stored in the electronic means, and the electronic means being operable to produce an output signal when both input magnitudes do not exceed both threshold values of at least one value pair and the output signal of the electronic means being operable to bring about a shifting of the rear wheel brake force regulating method from "select low" to "select high".

2. A motor vehicle according to claim 1, wherein the output signal of the electronic means is operable to effect the switching-on of a lockable differential if at the same time a regulated braking operation takes place.

3. A motor vehicle according to claim 2, wherein the switching-on of the lockable differential takes place with predeterminable rise velocity of the blocking action.

4. A motor vehicle according to claim 1, in which with a regulating method shifted to "select high", the brake pressure is increased at the wheel brake of the wheel with higher traction value with predeterminable rise velocity.

5. A motor vehicle with a three-channel anti-blocking brake system in which the brake force at the wheel brakes of the rear wheels is regulated in common by way of shiftable slippage thresholds, comprising cross-acceleration comparator means which inverts its output signal when exceeding a predetermined cross-acceleration value, vehicle velocity comparator means which inverts its output signal when exceeding a predetermined vehicle velocity value, and electronic means to which are fed as input magnitudes the instantaneous vehicle velocity and the instantaneous cross-acceleration, at least one value pair of a velocity threshold value and of a cross-acceleration threshold value coordinated thereto being stored in the electronic means, and the electronic means being operable to produce an output signal when both input magnitudes do not exceed both threshold values of at least one value pair and the output signal of the electronic means being operable to effect a switching of the predetermined slippage threshold to a higher value.

6. A motor vehicle according to claim 5, wherein the shifting of the predetermined slippage threshold value to the higher value takes place with predeterminable rise velocity.

7. A motor vehicle according to claim 5, wherein the output signal of the electronic means is operable to effect the switching-on of a lockable differential if at the same time a regulated braking operation takes pace.

8. A motor vehicle according to claim 7, wherein the switching-on of the lockable differential takes place with predeterminable rise velocity of the blocking action.

* * * * *